United States Patent [19]
Nelson et al.

[11] 3,980,460
[45] Sept. 14, 1976

[54] FEEDER FOR GLASS MELTING FURNACES

[75] Inventors: John L. Nelson, Los Gatos; Joseph S. Berg, Gilroy, both of Calif.

[73] Assignee: Owens-Corning Fiberglas Corporation, Toledo, Ohio

[22] Filed: May 2, 1974

[21] Appl. No.: 466,109

[52] U.S. Cl. ........................................ 65/29; 13/6;
65/135; 65/160; 65/335
[51] Int. Cl.² ........................................ C03B 3/00
[58] Field of Search ..................... 65/134–136,
65/335, 345, 29, 160; 13/6

[56] References Cited
UNITED STATES PATENTS

| | | | |
|---|---|---|---|
| 2,863,932 | 12/1958 | Gell et al. | 65/335 X |
| 3,397,972 | 8/1968 | Brichard et al. | 65/134 X |
| 3,486,874 | 12/1969 | Rough | 65/335 X |
| 3,748,112 | 7/1973 | Phillips | 65/335 |
| 3,877,917 | 4/1975 | Hohman | 65/135 |

*Primary Examiner*—Robert L. Lindsay, Jr.
*Attorney, Agent, or Firm*—John W. Overman; Charles F. Schroeder; Allen D. Gutchess, Jr.

[57] ABSTRACT

A glass batch feeder for an electrically-heated, glass-melting furnace is provided. The furnace typically includes a glass melting tank with electrodes immersed therein and with a batch feeder extending across the tank and movable back and forth from one end to the other to supply a layer of glass batch over molten glass in the tank. The batch is deposited gently on the top of the batch layer and in a positive, uniform manner to assure proper control of the thickness of the layer. The feeder includes a hopper and a rotatable distributor which intercepts batch from the hopper and deposits it in uniform increments onto the batch layer.

5 Claims, 6 Drawing Figures

U.S. Patent  Sept. 14, 1976  3,980,460
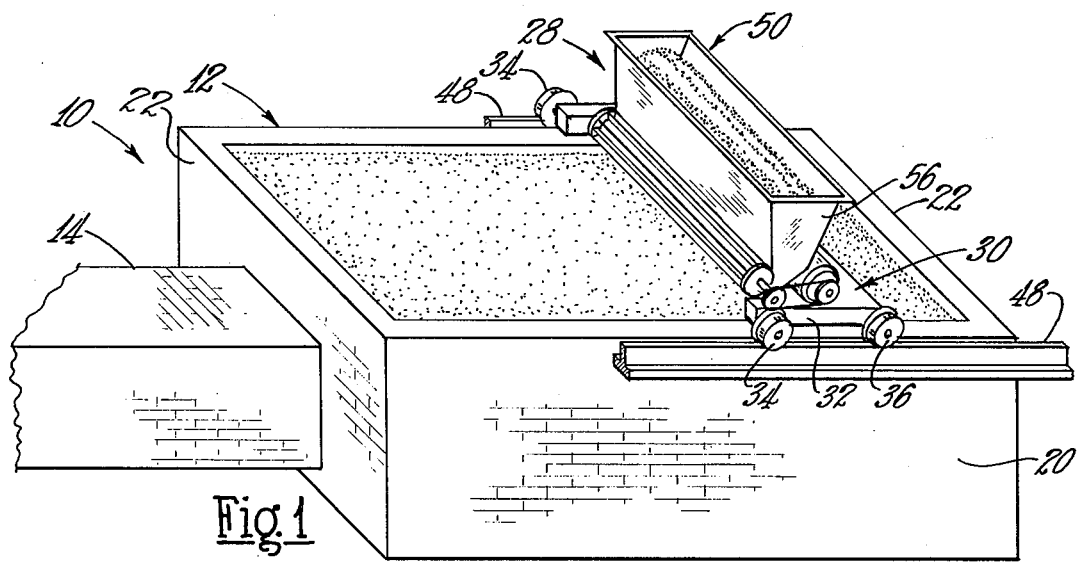
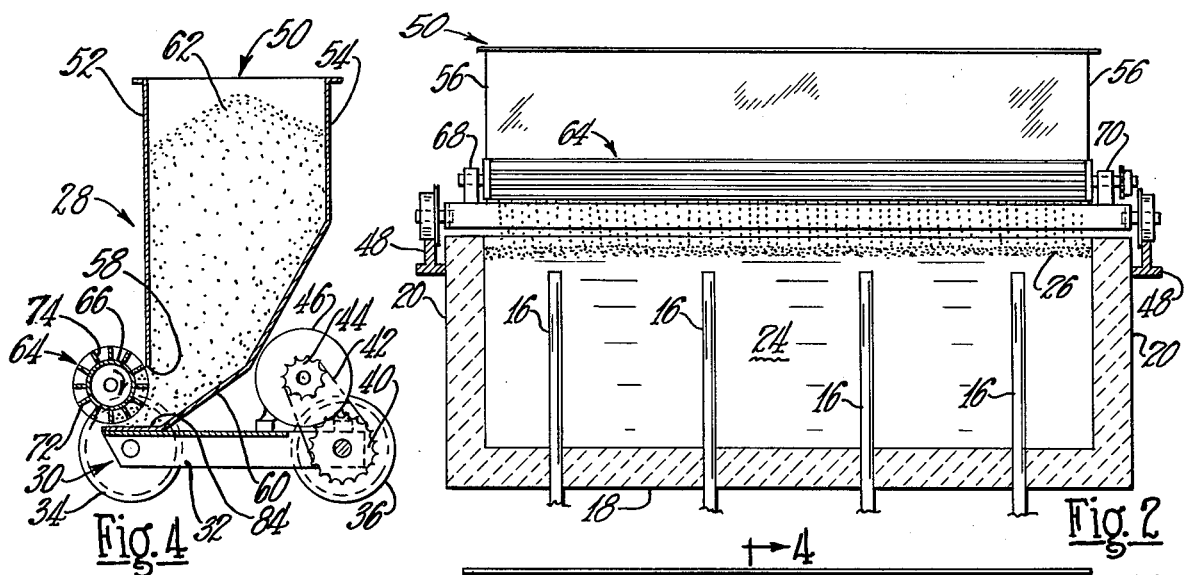
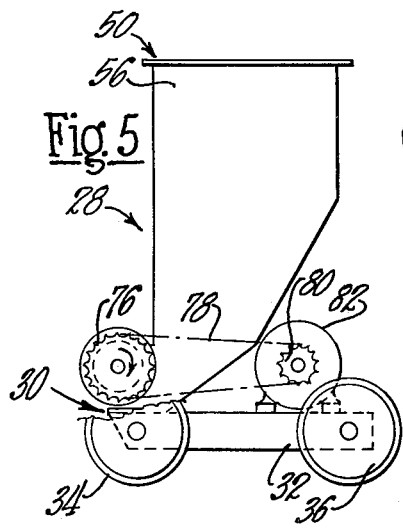
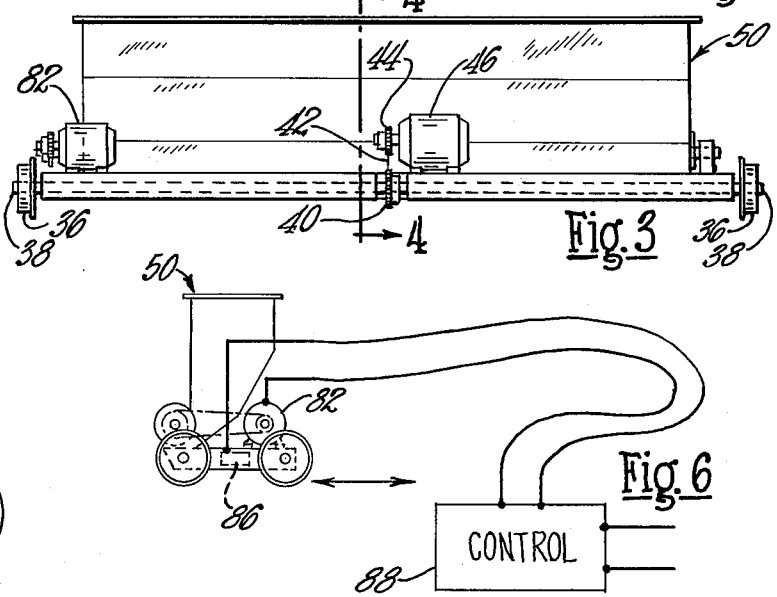

FEEDER FOR GLASS MELTING FURNACES

This invention relates to a batch feeder for depositing glass batch in positive, uniform increments onto a batch layer positioned on a pool of molten glass in a glass melting furnace.

In an electrically-operated, glass-melting furnace, electrodes project into the furnace tank and are immersed in molten glass therein, with glass batch continually supplied on top of the molten glass to provide both a source of supply and an insulating layer or crust thereon. Additional glass batch is supplied by a feeder which straddles the width of the tank and is movably supported on rails located at opposite sides thereof. The feeder is then moved back and forth between the ends of the tank to traverse the entire batch layer. The batch supplied to the layer must be carefully controlled to assure that a minimum thickness will be maintained over all of the top of the tank to reduce heat loss and to protect the feeder itself against excessive heat. The batch should also be supplied in a way to minimize the creation of dust. To accomplish these objectives, a hopper of the batch feeder is provided with a rotatable batch distributor located at a discharge opening of the hopper and positioned to engage batch at the opening and to supply it in positive, sequential increments from the hopper to the batch layer on the molten glass in the tank. Closer control over the distribution of the batch is thereby achieved than with feeders heretofore known which employ vibratory feeding arrangements or reciprocating gates to control the flow of batch from the hopper or other source to the batch layer. These prior arrangements have lacked positive feed and also caused a considerable amount of air-borne particles or dust due to the thin curtain or veil of batch particles more or less constantly emanating from the feeder.

It is, therefore, a principal object of the invention to provide an improved batch feeding method and a batch feeder for an electrically-operated, glass-melting furnace.

Another object of the invention is to provide a glass batch feeder which feeds the batch in positive, uniform quantities or increments.

A further object of the invention is to provide a glass batch feeder having a hopper with a rotatable distributor engageable with feed at the hopper opening.

Many other objects and advantages of the invention will be apparent from the following detailed description of preferred embodiments thereof, reference being made to the accompanying drawings, in which:

FIG. 1 is a schematic view in perspective of an electrically-heated, glass-melting furnace having a batch feeder in accordance with the invention;

FIG. 2 is a schematic view in transverse cross section taken through the furnace and feeder of FIG. 1 and showing the feeder in front elevation;

FIG. 3 is a rear view in elevation of the feeder of FIGS. 1 and 2;

FIG. 4 is a view in transverse cross section taken along the line 4—4 of FIG. 3;

FIG. 5 is an end view, with parts broken away, of the feeder; and

FIG. 6 is a diagrammatic view of a feeder and a control system for automatic operation.

Referring to the drawings, and particularly to FIG. 1, an overall glass melting furnace is indicated at 10 and includes a melting tank or container 12 from which molten glass is discharged through a discharge passage 14. For heating the furnace 10, the heating means include a plurality of electrodes 16 extending upwardly into the tank 12 from a lower level. The electrodes 16 are suitably positioned throughout the tank in a desired pattern as is well known in the electrical furnace art. The melting tank 12 is made of suitable refractory blocks and includes a bottom 18, side walls 20, and end walls 22.

The glass is melted by current flowing between the electrodes 16 to form a pool 24 of molten glass, and an additional layer 26 of glass batch is established on the surface of the pool 24. The batch layer 26 replenishes the molten glass of the pool 24 and also acts as an insulating blanket thereon to provide maximum efficiency for the furnace 10.

A batch feeder 28 embodying the invention includes a carriage 30 comprising an elongate, rectangular chassis 32 supported by idler wheels 34 and driven wheels 36. The driven wheels 36 are affixed to ends of a driven axle 38 which extend the entire length of the carriage 30 and has a driven sprocket 40 located centrally thereon. The sprocket 40 is driven through a chain 42 and a drive sprocket 44 by a suitable motor 46. With the central drive for both of the wheels 36, the same degree of twist or torque is placed on the axle 38 to assure that the wheels 36 are driven equally to maintain the carriage 30 truly perpendicular to the longitudinal extent of the tank 12. As shown in FIGS. 1 and 2, the wheels 34 and 36 ride on beams or rails 48 which are suitably supported beyond the side walls 20 of the tank 12. The rails 48 extend the full length of the tank 12 and beyond the forward end to a loading station (not shown) positioned beyond the front end wall 22. This station can be similar to one disclosed in a co-pending patent application of Charles M. Hohman, Serial No. 409,196.

In this instance, a single, elongate hopper 50 extends substantially the length of the carriage 30 and bridges substantially the entire span of the tank 12. As shown, the hopper 50 has front and rear walls 52 and 54 along with end walls 56. A lower, discharge opening 58 (FIG. 4) is formed between the lower edge of the front wall 52 and a sloping wall portion 60 of the rear wall 54. The opening 58 extends the full length of the hopper 50 with batch 62 in the hopper constantly being fed to the opening 58 by gravity.

In accordance with the invention, a rotatable, positive, incremental feed distributor 64 is positioned adjacent the opening 58 and is designed to intercept or penetrate the batch 62 in what would otherwise be its natural angle of repose at the opening 58. The distributor 64 includes a tubular shaft 66 extending the length of the hopper 50 and rotatably carried by bearing blocks 68 and 70 at the ends thereof. A plurality of generally radially-extending plows or fins 72 extend outwardly from the tubular shaft 66 and form pockets 74 extending the length of the distributor 64. A driven sprocket 76 is located on an end of the shaft 66 and is rotated through a chain 78, a drive sprocket 80, and a motor 82. The member 64 is rotated in a clockwise direction as viewed in FIG. 4 so as to sequentially present the plows 72 and the pockets 74 to the batch 62 at the opening 58. As the pockets move clockwise, they receive the batch 62 as the plows 72 push and carry the batch over and beyond a short discharge platform 84 and drop the batch increments by gravity onto the layer 26 of the batch. Each of the pockets 74 always contains a uniform amount of the batch 62 as picked up by the plows 72, the amount depending on the penetration of the plows into the batch, to provide positive, incremental batch quantities for supplying the batch layer. The quantity of the batch thereby can be accurately controlled as compared to batch feed accomplished through vibratory or sliding motions wherein any unevenness in the motion of the overall feeder can interfere with the amount of batch fed and where variations in the batch itself or atmospheric conditions can change the rate of discharge of the batch for any given setting of the feeder. Further, with the batch being supplied in increments rather than in thin curtains, the batch is less affected by air currents and a reduction in batch dust may be experienced.

Rather than employing a single hopper and a single distributor, several individual hoppers and separately driven, short distributors can be employed to provide selective control zones for regulation of the thickness of the layer 26 over the width of the tank 12. Whether one or several zones are provided, however, it is also possible to automatically control the feed of the batch simply by controlling the rate of rotation of the distributor 64. Referring to FIG. 6, a commercially-available sensing device 86 can be mounted on the carriage 30 to sense the thickness of the batch layer 26. The sensor 86 then supplies a signal to a commercially-available control unit 88 which, in turn, controls the power to the motor 82 to control the rate of rotation of the distributor 64. By way of example, the sensor 86 can sense heat, with the thinner the layer 26, the more the heat sensed. Accordingly, under such conditions, the control 88 will cause the motor 82 to rotate faster to supply more batch to the layer 26 and increase its thickness, thereby reducing heat loss.

Various modifications of the above described embodiments of the invention will be apparent to those skilled in the art, and it is to be understood that such modifications can be made without departing from the scope of the invention, if they are within the spirit and the tenor of the accompanying claims.

We claim:

1. Apparatus for depositing particulate material over a desired area, said apparatus comprising a carriage, a hopper supported on said carriage and having an elongate discharge opening extending across a substantial portion of the width of the area, means for driving said carriage back and forth over the area from one end to the other, a material distributor located at said elongate opening and engageable with particulate material fed by gravity to the opening, said distributor comprising a plurality of elongate plow members, means for moving said plow members sequentially in a transverse direction near said elongate opening to engage particulate material at the opening and to move the material to a position where it can fall by gravity onto the area, means for sensing the thickness of the particulate material deposited by said material distributor, and means for controlling the rate of movement of said plow members by said moving means in response to the thickness of the layer sensed by said sensing means.

2. Apparatus according to claim 1 characterized by said moving means comprises means for rotating said plow members about an axis near said opening.

3. Apparatus according to claim 1 characterized by said plow members being elongate strips, and said distributor further comprises a shaft extending along said hopper opening from which said strips extend generally radially.

4. Apparatus according to claim 3 characterized by said strips being affixed to said shaft substantially along their entire lengths to form a plurality of elongate, closed pockets between adjacent ones of said strips.

5. In a method of operating an electrically-heated, glass-melting furnace which comprises forming a pool of molten glass, projecting electrodes into the pool and supplying power thereto to heat the pool, and forming a layer of batch material on top of the pool of molten glass, the improvement which comprises adding batch material to said layer by depositing the batch material thereon in individual, uniform, sequential increments across substantially the entire layer, sensing the thickness of the layer of batch material on top of the molten glass, and changing the rate of deposition of the batch material thereon in response to the sensed thickness of the layer.

* * * * *